2 Sheets--Sheet 1.
T. T. WOODRUFF.
Improvement in Coffee-Hullers.
No. 132,887.  Patented Nov. 5, 1872.
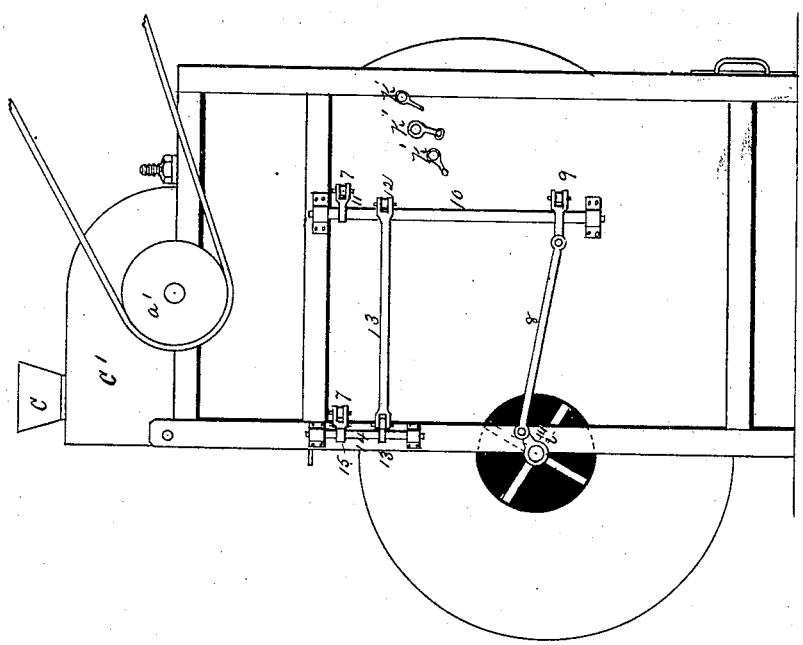
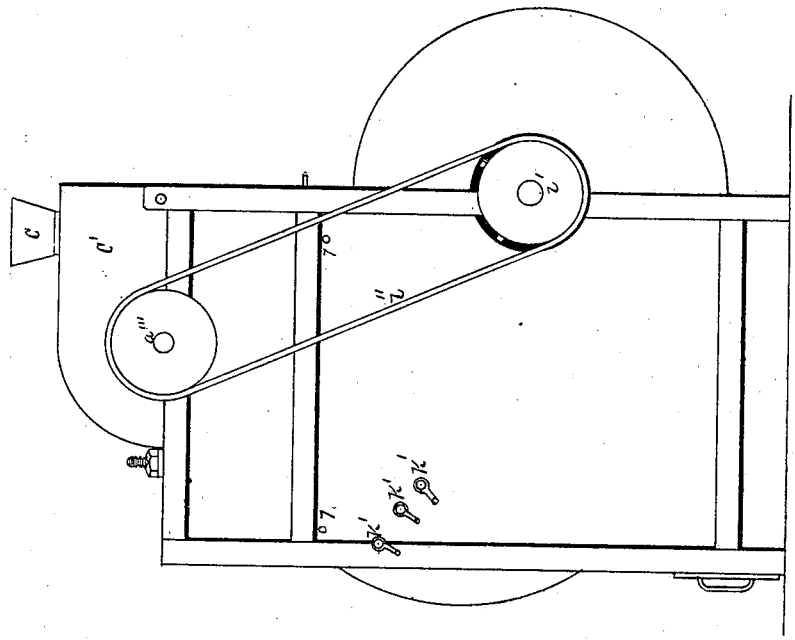
WITNESSES:  INVENTOR:

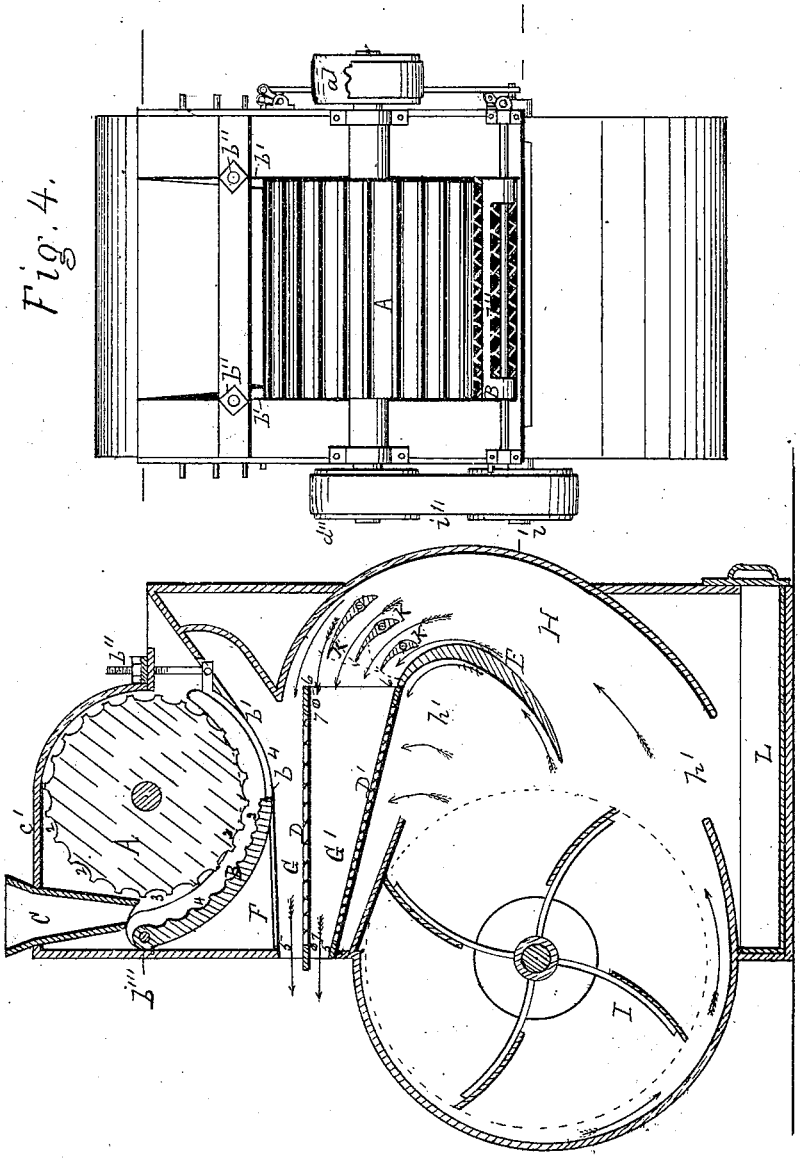

UNITED STATES PATENT OFFICE.

THEODORE T. WOODRUFF, OF PHILADELPHIA, PENNSYLVANIA, ASSIGNOR OF ONE-HALF OF HIS RIGHT TO EDWARD S. MORRIS, OF SAME PLACE.

IMPROVEMENT IN COFFEE-HULLERS.

Specification forming part of Letters Patent No. 132,887, dated November 5, 1872.

*To all whom it may concern:*

Be it known that I, THEODORE T. WOODRUFF, of the city of Philadelphia, Pennsylvania, have invented certain Improvements in Coffee-Hulling Machines, of which the following is a specification:

My improvements relate to a machine for separating the coffee-berry from the hull in its matured state.

The first part of my invention relates to the crushing-cylinder of a coffee-hulling machine; and consists of a series of longitudinal parallel grooves equidistant from each other around in the circumference of the same, and the several grooves being alike and of an elliptical curve in its transverse section and of a depth and width sufficient to receive the berry lengthwise in the groove after the hull has been broken and the berry thus released; the object of this part of my invention being to give sharp edges to the sides of the grooves, for the purpose of more readily and certainly breaking the hard shell or hull, and at the same time affording a shallow groove for the reception of the berry, so that it will pass out between the cylinder and the concave without being crushed, broken, or cut. The second part of my invention relates to the concave, which operates in combination with the crushing-cylinder of a coffee-hulling machine, and has alternating shallow grooves and low ridges across its upper or concave side which are circular in their transverse section and diminish gradually in width and depth or height from the upper to the lower end, or from the entrance to the exit end, of the concave, and the ends of the said grooves and ridges being inclosed by an upright flange at each side edge of the concave, so as to receive the cylinder between them; the object of this part of my invention being to produce unfailing supports to retain the various sizes of the nuts containing the berries until crushed or broken by the rotating cylinder and to permit the berries to be carried out or discharged by the cylinder at the lower end only of the concave. The third part of my invention relates to a division of the blast of air into two parts, an outer and stronger one which enters above the lower screen and an inner and weaker one which passes directly upward through the lower screen; the object of this part of my invention being two-fold—first, to drive out the hulls which will not pass through the upper or horizontal screen, as well as those which, with the berries, pass through it to the lower or inclined screen by means of the outer or stronger division of the blast; and second, to keep the berries in a dancing motion by the upward passage of the inner or weaker division of the blast, and thus facilitate their descent down over the inclined or lower screen, and at the same time prevent any small particles of the shells or dust from passing down through the said lower screen. The fourth part of my invention relates to the combination of a series of adjustable deflecting-valves or plates with the outer or stronger division of the blast-channel in such a manner that the blast through the outer division may be increased or diminished in force in its passage through the spaces above and below the upper screen, or confined to the said lower space, as may be found the most effective for separating the hulls from the berries. The fifth part of my invention relates to the combination, with the two rigidly-connected screens and a crank on the shaft of the blast-wheel, of a series of vertical levers and connecting-rods in such a manner that quick lateral motions without any longitudinal motions will be given to the said connected screens, for the purpose of giving the required agitation to the hulls and berries without pitching the latter toward the lower end of the bottom screen. The sixth part of my invention relates to the combination, with the open space in the bottom of the blast-chamber, of a close receptacle for the coffee-berries, for the purpose of preventing any of the blast of air from escaping through the said receptacle and thus breaking the force of the upward currents of air.

Figure 1 is an elevation of one side of my improved coffee-hulling machine. Fig. 2 is an elevation of the opposite side of the same. Fig. 3 is a vertical longitudinal section embodying my invention. Fig. 4 is a top view of the machine without its cap and hopper.

The crushing-cylinder A is supported transversely or across the top, and is driven at high speed by means of a pulley, $a'$, and a band leading to any suitable motive-power, 2 2, being the longitudinal grooves and sharp ridges therein before described. The concave B has the alternating shallow grooves and low ridges 3 3 across its upper or concave side and an elevated flange, 4, at each end, as before described. It is adjustably supported at its lower end by two arms, $b'\,b'$, which project from the two lower corners of the concave and connect with respective screw bolts and nuts $b''\,b''$, whereby the said lower portion of the concave can be raised or lowered at will. The upper end of the said concave is supported by a cross-bar, $b'''$, upon which it turns like a hinge when being adjusted. Its upper end is set sufficiently far from the concave B to freely admit the largest-sized nuts between them, but the succeeding portions of the grooved upper side gradually approach the cylinder until its lowest portion nearly touches the cylinder at $b^4$. The hopper C and cap $c'$ cover the cylinder A, and the hopper C opens directly into the space between the upper end of the concave B and the cylinder A. (See Fig. 3.) The upper screen D and the lower screen D′ are rigidly connected together, the one a short distance above the other, at their hull-and-blast discharging ends 5 5, but at a greater distance apart at their inner ends 6 6, and supported by transverse bars 7 7, so that the upper screen D will be nearly horizontal and the lower screen D′ sloping downward to the partition E, which divides the blast of air into two parts. The upper screen D and a partition, F, below the concave B produce between them a channel, G, opening at 5 and communicating with the curved channel H, through which the outer and stronger blast of air is driven by the rotary fan-wheel I in the lower portion of the case of the machine. The two screens produce a channel, G, between them, which opens at 5 for the discharge of the hulls and blast, and communicates at its wider inner end with the main blast-channel H. (See Fig. 3.) The partition E extends in a curved manner downward from the lower end of the screen D′ nearly to the circular line of motion of the ends of the wings of the fan-wheel I; and the shell of the latter and the shell of outer channel H leave an open space, $h'$, between them for the coffee-berry to drop down from the channel H into a drawer, L, or close bin, in or connected with the lower end of the machine. Rotary motion is given to the fan-wheel I by means of a pulley, $i'$, on one end of its shaft, and a band, $i''$, which is driven by a pulley, $a'''$, on the end of the shaft of the cylinder A. On the opposite end of the shaft of the wheel I there is fixed a short crank, $i'''$, which connects, by a rod, 8, to the lower arm 9 of a vertical lever, 10, which has at its upper end an arm, 11, which is articulated to one of the supporting-bars 7 of the connected screens, and also another arm, 12, which connects, by a rod, 12, with the arm 13 of another parallel or vertical lever, 14, which has another arm, 15, which is articulated to the other supporting-bar, 7, of the screens, all the said parts being arranged and connected together so that the rotary motion of the fan-wheel I will give rapid motions to the screens D D′ in lateral directions only. K K K are the adjusting-valves for varying the directions of the main blast in relation to the screens D and D′, each of which turns upon a horizontal journal-bar, and is operated by means of a hand-crank, $k'$, as occasion may require.

*Operation.*

The cylinder A being put in rapid rotary motion and the position of the concave B adjusted to the proper distance at its lower end from the cylinder, the hard or mature coffee-nuts are poured into the hopper C, from which they fall between the cylinder and concave, and the hulls or shells broken and crushed between them and thrown out at the lower end of B with the solid unbroken berries, dropping from the protecting grooves of the cylinder A and falling together upon the upper screen D. The larger fragments of the hulls are blown out through the upper outlet 5, the berries with the smaller fragments of the hulls passing through the meshes of screen D and falling upon the inclined screen D′. The said small fragments of the hulls are blown out through the lower opening 5 while the berries are discharged into the main blast-channel H, and, falling through the strong blast of air which is driven upward through the channel, drop in a perfectly "hulled" and clean state into the drawer or bin below.

The specific gravity of the hulls and of the berries of the mature nuts are nearly alike; but the hulls being concavo-convex and fragmentary, and the berries solid lumps, the strength of the main blast through the channel H to the outlets 5 5 must be regulated and guided by the valve-plates K′ K′, so that the berries shall not be driven out with the hulls, but be caused, by the quick lateral motions of the screens, aided by the slightly-lifting effect of the weaker division of the blast, which passes directly upward through the inclined screen D′ upon the berries, to be rapidly advanced against or through the blast from the channel H until they leave the screen D′ and fall through the said channel H, as before described.

I claim as my invention—

1. In combination with the hulling-cylinder A of a coffee-hulling machine, the series of curved grooves 2 2, substantially as and for the purpose hereinbefore set forth.

2. In combination with the cylinder A, the concave B, having the parallel transverse grooves and ridges 3 3, constructed and arranged substantially as and for the purpose hereinbefore set forth.

3. The partition E or its equivalent, in combination with the blast-wheel I and the screens D and D′, arranged to operate together for the purpose of dividing the blast of the wheel I into two separate portions, the outer or stronger one passing between and above the said screens and the inner or weaker one up through the lower screen to the final outlets, substantially as and for the purposes set forth.

4. The adjustable valves or plates K K K, in combination with the channel H of the air-blast, said valve-plates being arranged to operate in relation to the screens D and D' and the outlet-channels above the same substantially as and for the purpose hereinbefore set forth.

5. In combination with the crank $i'''$ on the shaft of the blast-wheel I, and with the screens D and D', the operative devices, consisting of the parts 7, 8, 9, 10, 11, 12, 13, 14, and 15, constructed and arranged to give the quick lateral sliding motions to the said screens, substantially as and for the purpose hereinbefore set forth.

6. In combination with the open space $h'$ in the bottom of the blast-chamber, the close drawer L, or its equivalent close bin or receptacle for the cleaned coffee-berries as they are discharged through the said opening $h'$, substantially as described, for the purpose of preventing any of the blast from escaping downward or through the receptacle or bin, and consequently breaking or diminishing the upward force required in the said blast.

THEODORE T. WOODRUFF.

Witnesses:
BENJ. MORISON,
WM. H. MORISON.